US010224726B1

(12) United States Patent
Fluegge et al.

(10) Patent No.: US 10,224,726 B1
(45) Date of Patent: Mar. 5, 2019

(54) ELECTRICAL CONNECTION ASSEMBLY FOR BASE UNIT OF BATTERY-POWERED HANDHELD ID CODE READER

(71) Applicant: Cognex Corporation, Natick, MA (US)

(72) Inventors: Kai Fluegge, Aachen (DE); Laurens Nunnink, Simpleveld (NL); Robert Broeskamp, Hauset (BE)

(73) Assignee: COGNEX CORPORATION, Natick, MA (US)

( * ) Notice: Subject to any disclaimer, the term of this patent is extended or adjusted under 35 U.S.C. 154(b) by 509 days.

(21) Appl. No.: 13/803,309

(22) Filed: Mar. 14, 2013

(51) Int. Cl.
*H02J 7/00* (2006.01)
(52) U.S. Cl.
CPC .......... *H02J 7/0044* (2013.01); *H02J 7/0027* (2013.01); *H02J 7/0045* (2013.01)
(58) Field of Classification Search
CPC ....... H02J 7/0044; H02J 7/0045; H02J 7/0027
USPC .............. 320/113–115; 235/472.01
See application file for complete search history.

(56) References Cited

U.S. PATENT DOCUMENTS

| | | | |
|---|---|---|---|
| 6,208,734 B1 | 3/2001 | Ortscheid et al. | |
| 7,385,807 B1 | 6/2008 | Chuang | |
| 7,524,197 B2 | 4/2009 | Mills et al. | |
| 8,241,050 B2 | 8/2012 | Xu et al. | |
| 2010/0088843 A1 | 4/2010 | Reed et al. | |
| 2011/0073658 A1* | 3/2011 | Vassura | G06K 7/10881 235/472.01 |
| 2011/0134601 A1 | 6/2011 | Sa | |
| 2011/0175408 A1 | 7/2011 | Ridler et al. | |
| 2011/0261546 A1* | 10/2011 | Smyth | G06F 1/1632 361/807 |

FOREIGN PATENT DOCUMENTS

JP 01174256 7/1989

* cited by examiner

*Primary Examiner* — Zixuan Zhou
(74) *Attorney, Agent, or Firm* — Loginov IP (57) ABSTRACT

This invention provides a base unit for charging a handheld ID reader in which the charging contacts are mounted on a contact holder that is biased rearwardly during insertion of the reader, and thereafter snaps back in place and locks the reader after the reader has been pushed into a fully seated position in a well of the base unit. This lock is maintained between shoulders on the holder and corresponding locking tabs on the bottom face of the reader. The locking tabs are conductive, and provide two additional electrical contacts that engage contact pads on the reader bottom face. Each of the power and ground signals are connected over at least two electrical contacts between reader and base station, increasing reliability, especially when the reader is not in its fully seated position. An indicator LED is integrated in the base station enclosure near the charging contacts.

16 Claims, 7 Drawing Sheets

ELECTRICAL CONNECTION ASSEMBLY FOR BASE UNIT OF BATTERY-POWERED HANDHELD ID CODE READER

FIELD OF THE INVENTION

This invention relates to battery-operated, handheld ID code reading and decoding devices and more particularly to a base using interconnections for charging such units.

BACKGROUND OF THE INVENTION

Machine vision systems (also simply termed "vision systems") use image acquisition devices that include camera sensors to deliver information on a viewed subject. The system then interprets this information according to a variety of algorithms to perform a programmed decision-making and/or identification function. An image of an object containing features of interest to the system is acquired by an on-board image sensor (also termed, simply an "imager" or "sensor") in the visible, and/or near-visible light range under appropriate illumination, which can be based upon ambient light, and/or light provided by an internal and/or external illuminator.

A common task for vision systems is the reading and decoding of symbology (e.g. one-dimensional and two-dimensional codes—also termed "IDs") used in a wide range of applications and industries and can take the form of 1D barcodes, 2D DataMatrix Codes, QR Codes and Dot-Codes, among others. The image sensor acquires images (typically grayscale or color, and in one, two or three dimensions) of the subject or object, and processes these acquired images using an on-board or interconnected vision system processor. The processor often includes both processing hardware and non-transitory computer-readable program instructions (software) that perform one or more vision system processes to generate a desired output based upon the image's processed information. This image information is typically provided within an array of image pixels each having various colors and/or intensities. In the example of an ID reader (also termed herein, a "camera"), the user or an automated process acquires an image of an object that is believed to contain one or more barcodes, 2D codes or other ID types. The image is processed to identify encoded features, which are then decoded by a decoding process and/or processor to obtain the inherent alphanumeric data represented by the code.

A common form of ID reader used in industrial (and other commercial) applications is the handheld ID reader. This type of reader typically includes a grip that enables the user to carry the reader around a floor space and aim the device at various objects. The grip is provided with one or more trigger buttons that allow the user to direct the acquisition of an image of an object containing an ID after it is aimed at that object. This acquired image is then decoded and the information is transmitted (typically wirelessly) to a receiving unit. The receiving unit transfers the information to another data-handling system, such as an inventory tracking or logistics application running on a server or other computing device (e.g. a PC).

Typical contemporary handheld ID readers include a rechargeable battery and a plurality of charging and data contacts that removably engage with corresponding contacts on a base unit. The base unit is interconnected with a power source, such as wall current, and can include various data connections (e.g. USB, Ethernet, etc.) that enable the base unit to act as a wireless receiver for code data transmitted from the handheld ID reader. Such data is collected by the base unit and forwarded via the data connection to the data handling system. Alternatively, a separate wireless receiver operatively connected to the data handling system can be employed.

Most conventional base units (for example, those available from Honeywell or Motorola) use electrical spring contacts to removably connect with the handheld ID reader. A common disadvantage of such arrangements is that their contacts wear out and/or can be damaged easily. Thus, precise insertion of the reader into the base unit is required, and it proves difficult to maintain a reliable contact due to close tolerances, contamination and insufficient pressure by the reader's contact pads on the base unit's contacts.

SUMMARY OF THE INVENTION

This invention overcomes disadvantages of prior art by providing a base unit for charging a handheld ID reader in which the charging contacts are mounted on a contact holder that is biased rearwardly during insertion of the reader, and thereafter snaps back in place and locks the reader after the reader has been pushed into a fully seated position in a well of the base unit. This lock is maintained between shoulders on the holder and corresponding locking tabs on the bottom face of the reader. The rearward spring-loaded motion of the contact holder and associated contact pins avoids application of potentially damaging force on these electrical contacts during insertion, and renders it easier for the user to insert the reader into the base unit. Illustratively, the locking tabs are conductive, typically constructed to include a conductive surface (either being molded from polymer with embedded contacts, or being constructed as separate metal structures), and act as two additional electrical contacts, along with the pin contacts that engage contact pads on the reader bottom face. As such, each of the power and ground signals are connected over at least two electrical contacts between reader and base station. This renders the electrical connection more reliable, especially when the reader is not in its fully seated position, but tilted or shifted. An indicator LED is also integrated in the base station enclosure near the charging contacts, and delivers immediate feedback as to whether reader battery is charging.

In an illustrative embodiment, a base unit for charging a handheld ID reader with a grip handle includes a housing having a well constructed and arranged to receive and hold the reader. A contact holder, typically located on a rear wall of the well, provides a plurality of contacts thereon that project forwardly from a surface of the well to removably engage corresponding contacts on a contact-carrying surface of the reader. This contact-carrying surface is typically located on the bottom face of the bottom end (the free end opposite the read head) of the grip handle. The contact holder is constructed and arranged to allow the contacts to move against a spring force applied by the contact holder when the contact-carrying surface of the reader passes over the contacts as the reader is received by the well. The contact holder illustratively includes leaf spring members that can be unitarily constructed or integral. The leaf spring members are constructed and arranged to allow springed motion (rearwardly on the base housing) in response to passage of locking tabs on the bottom face over shoulders on the contact holder. The shoulders lock against the locking tabs when the bottom end is seated within the well and the leaf spring members bias the contacts into a forward position. Illustratively, the contact holder includes a circuit board having a plurality of contact pins and the reader includes a plurality of contact pads. These contact pads can be separated by guiding fins that pass around the pins as the reader (i.e. bottom end) is inserted into the well. The locking tabs can be conductive and interconnected with a battery of the handheld ID reader. The base unit can also provide charging contacts that electrically connect each of the locking tabs respectively. Notably, a charging circuit can be provided in the base unit to charge the battery when at least one of the charging contacts is interconnected to at least one of the charging tabs and at least one of the plurality of contacts on the contact holder electrically connects to at least one of the corresponding contacts on the bottom face. Alternatively, the reader battery can be charged when both locking tabs are fully engaged and the charging tabs are connected (and charging occurs in this configuration regardless of whether the pins engage the reader's contact pad—i.e. whether "zero or more" pins engage). Illustratively, the leaf spring members are tapered outwardly and engage opposing side walls of the housing. The leaf spring members are constructed and arranged to flex and rotate torsionally in response to a rearward biasing force on the contact holder. In addition, the contact holder includes top wings each defining a top edge that provides an axis or rotation about which the contact holder rotates when the leaf spring members are flexed and rotated torsionally. In an embodiment, a charge indicator (e.g. an LED) is located on the housing proximate to the bottom end to better assist the user in ensuring that the reader is sufficiently seated in the base unit to charge.

BRIEF DESCRIPTION OF THE DRAWINGS

The invention description below refers to the accompanying drawings, of which.

DETAILED DESCRIPTION

Figure 1:
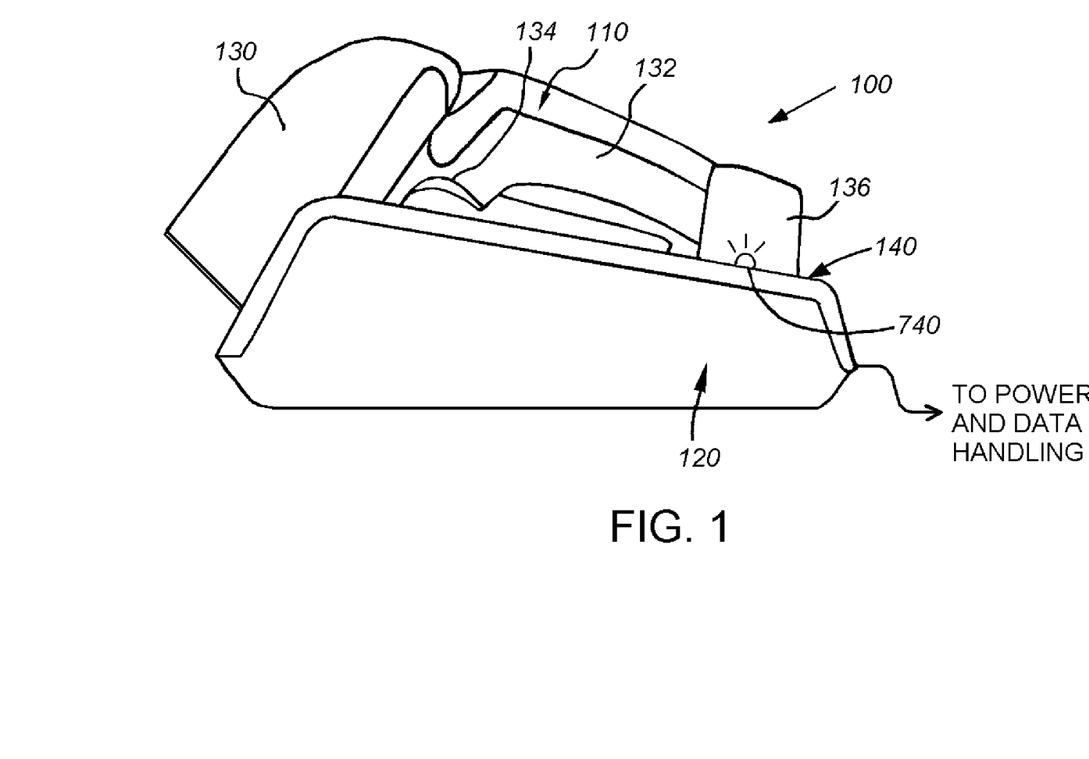
FIG. 1 is a side view of the base unit with cradled, handheld ID reader according to an illustrative embodiment.

FIG. 1 shows an assembly 100 in which a handheld ID reader 110 mounted within a base unit 120 according to an illustrative embodiment. The handheld ID reader 110 (also termed simply "reader") includes a read head 130 that can contain optics, an image sensor, a vision system processor and illuminator according to any acceptable arrangement. A grip handle 132 extends from the read head and can include a trigger assembly 134 for acquiring images of objects containing ID codes. As shown, the bottom end 136 of the grip handle 132 resides at the end 140 of the base unit 120. In this position, the base unit 120 electrically connects to the reader 110 providing both charging power and appropriate data transfer. As shown, the base unit 120 interconnects to a power source, such as wall current (potentially using an appropriate transformer and/or AC-DC rectifier). The base unit 120 can also interconnect to a data network using, for example a wired or (typically) wireless TCP/IP Ethernet connection operating under an appropriate wireless communication standard, such as IEEE 802.11 (i.e. WiFi). In various embodiments, power can be supplied by a wired Ethernet cable using a conventional Power over Ethernet (PoE) arrangement.

Figure 2:
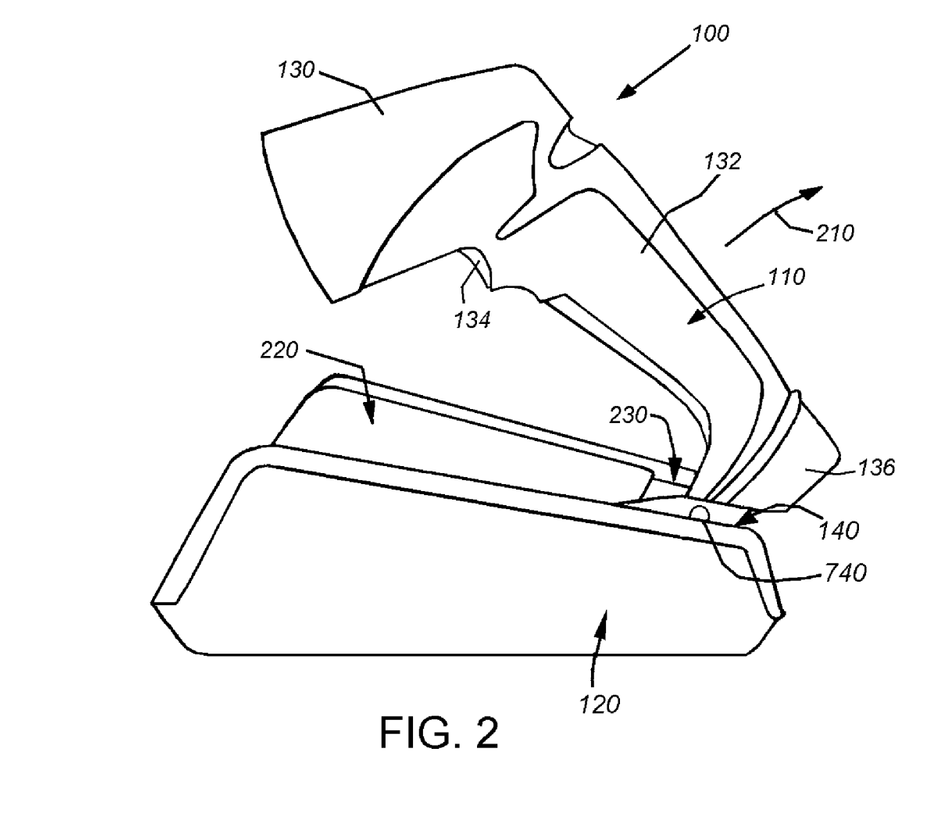
FIG. 2 is a side-oriented perspective view of the base unit and handheld ID reader of FIG. 1 showing the ID reader partially lifted out of the cradle to either insert thereinto or remove therefrom by a user.
Figure 3:
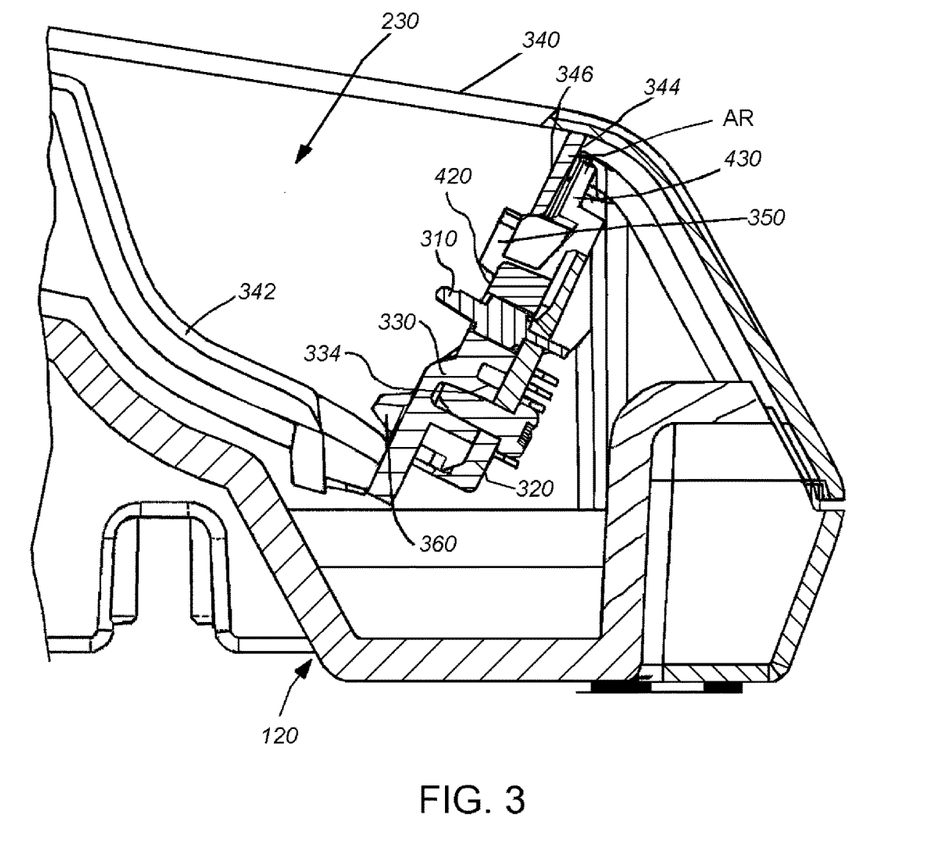
FIG. 3 is a fragmentary side cross section of the base unit in the region of the connector pins taken generally along a longitudinal centerline of the base unit.
Figure 4:
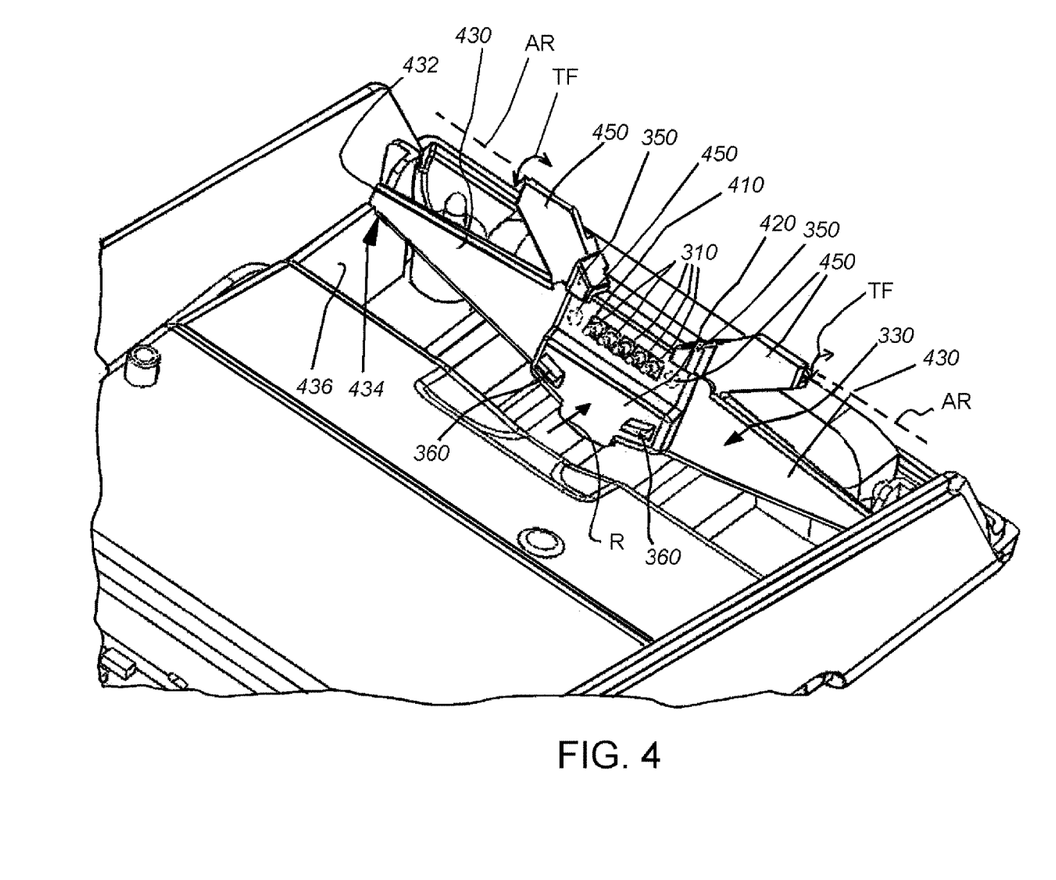
FIG. 4 is a fragmentary perspective view of the base unit in the region of the connector pins showing the contact-holding assembly and with the top cover removed from the base unit.

As shown in FIG. 2, the reader 110 has been lifted in a rotational manner (curved arrow 210) out of the base unit 120. This motion can occur either during removal of the reader 110 from the base unit 120, as shown, or in re-engaging the reader 110 with the base unit 120 after use. The base unit 120 includes a contoured well 220 that conforms to the shape of the grip and read head, as well as a shallower and narrower rear well 230 at the end 140 adapted to receive (e.g., lockably receive) the bottom end 136 of the grip handle 132.

With reference generally to FIGS. 3-6, the structure and function of the connector pin carrying assembly, and its interaction with the bottom end of the grip handle is shown and described in further detail.

The illustrative five-pin (pins 310) arrangement (greater or fewer pins can be employed in alternate embodiments) of contacts reside on a circuit board 320 that is operatively connected with other circuits (e.g., power regulation, control, communication, etc.—not shown) within the base unit 120. The circuit board is secured to a polymer contact-holding assembly ("contact holder") 330 via threaded fasteners 332 with fastener heads that engage a rear side of the circuit board 320, and thread into receiving holes 334 on the rear side of the contact holder 330. The pins 310 pass through a rectangular cutout 410 (FIG. 4) in the central contact-carrying area 420 of the holder 330. On each opposing side of the contact-carrying area 420 is a unitarily formed (e.g. molded) leaf spring 430. Each spring 430 tapers in an outward direction from the area 420 and includes an outer end 432 that is cradled within a groove 434 in the side wall 436 of the lower housing of the base unit. Note that the upper housing (340 in FIG. 3) is removed for clarity in FIG. 4 and defines the bottom 342 of the well 230. This upper housing 340 also retains the contact holder 330 in place at area 344. This area 344 of the upper housing 340 also includes a front wall 346 that covers and retains the unexposed portions of the holder 330.

In the illustrative embodiment, the leaf spring members 430 of the contact holder 330 include upper wings 450. The leaf spring members are adapted to flex rearwardly (arrow R) and torsionally curved arrows TF about an axis AR defined by the top edge of the wings 450. This flexure allows the central contact-carrying area 420 to move as a unit rearwardly when biased by the bottom end 136 of the reader during insertion into the well 230 as shown by the double arrow FH in FIG. 5. Referring also to FIG. 6, the bottom face 510 of the reader 110 includes a contact area 610 having a pair of opposing, raised shoulders that form "locking tabs" 620, which surround a contact pad assembly 630. The contact pad assembly 630 is shown consisting of five elongated contact pads 640 separated by raised fins 650. The fins 650 assist in guiding the pins (e.g., pins 310 of FIG. 3) onto the pads 640. The fins 650 are sufficiently elongated so that they maintain electrical contact even when the reader is only partially seated in the base unit well 230.

Figure 5:
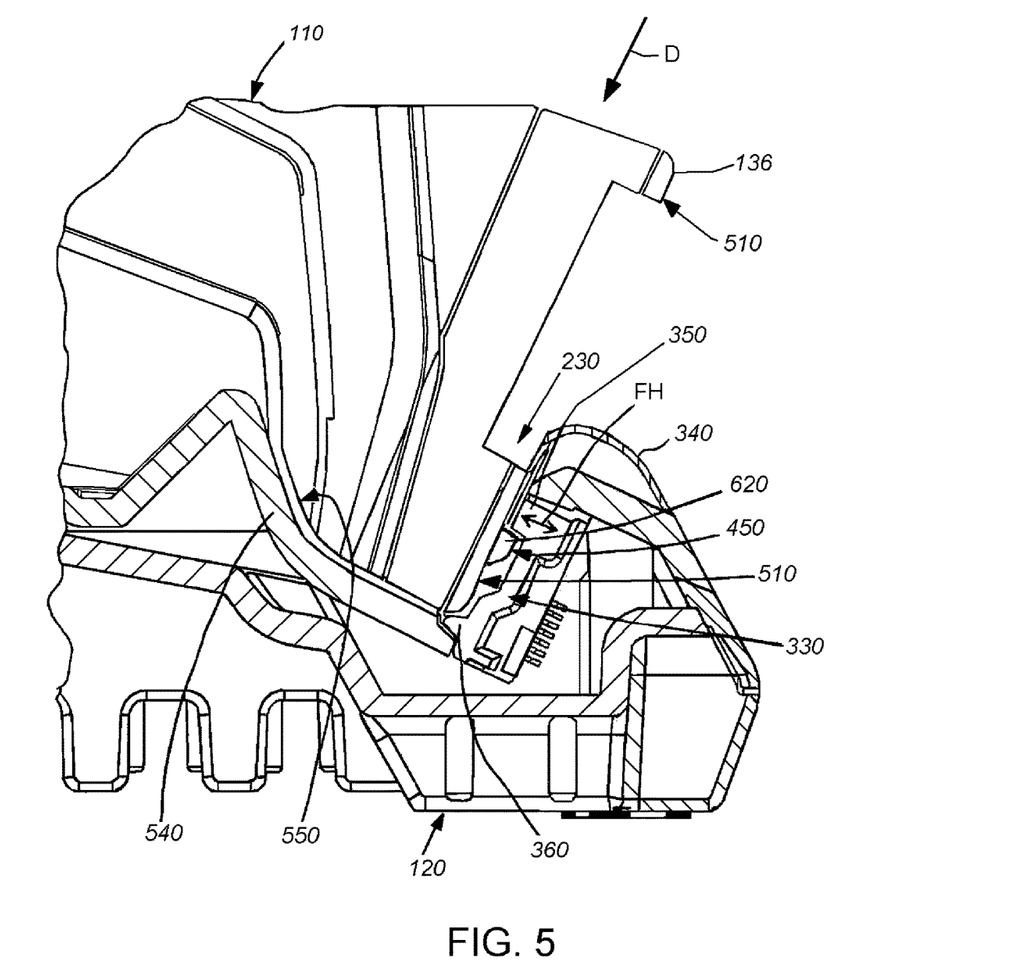
FIG. 5 is a partial side cross section of the base unit in the region of the connector pins with a the end of the handheld ID reader of FIG. 1 secured against the connector pins.
Figure 6:
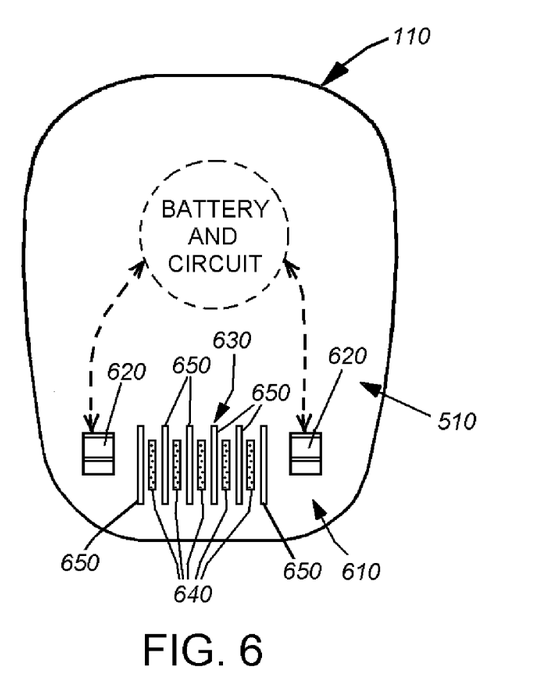
FIG. 6 is a rear view of the connecting pads and locking shoulders of the handheld ID reader of FIG. 1.

As shown in FIG. 5, the fully seated reader 110 causes the contact holder 330 to spring rearward as the locking tabs 620 pass downwardly (arrow D) with the motion of the reader's bottom end 136. A front well wall 540 conforms to the front face 550 of the reader's bottom end so that the end is "funneled" against the contact holder 330. Thus, the locking tabs 620 ride over shoulders 350, causing the entire holder, with pins to spring rearwardly. Once the locking tabs 620 pass fully over the shoulders 350 (as shown in FIG. 5), the holder springs forwardly again, placing the pins 310 in secure electrical engagement with the contact pads 640. Note that the top sides of the shoulders 350 are tapered downwardly and inwardly to assist in centering the tabs 620 when they are driven downwardly. The locking tabs 620 can be conductive and interconnected with the battery circuit in the reader 110. In an embodiment they can be part of the unitary molded structure of the reader bottom, and can include embedded contact pads formed from a conductive material, such as metal. In other embodiments, the locking tabs 620 can be partially or fully constructed from metal and secured integrally to the bottom. These locking tabs 620 engage additional contacts 450 located on the contact holder (and connected to the circuit board 320 of FIG. 3) on each side of the pin assembly (pins 310). These charging contacts 450 can be sprung or fixed with respect to the circuit board 320 and contact holder 330. The bottom edge of the contact holder 330 includes shelves 360 that engage a rear edge of the front well wall 540 as shown clearly in FIG. 5. These shelves 360 guide rearward motion and prevent excess forward motion of the contact holder 330 beyond a forward-most limit.

In an embodiment, the contact holder 330 is constructed from a unitary material, such as polyoxymethylene (POM). Other polymers and similar-characteristic materials (e.g. composites, certain metals and combinations of such materials) can be used in alternate embodiments—for example the portion carrying the circuit board can be polymer and the spring members can be spring steel, formed as an integral unit. In general the materials chosen for the spring and contact carrier should exhibit low wear, and maintain their of their spring force under repeated cyclic loading in an industrial environment.

The dimensions of the base unit 120 and reader 110 are highly variable in illustrative embodiments. The central contact-carrying area 420 of the contact holder 330 is thicker to provide rigidity. The spring members 430 are thinner to allow flexure. By way of non-limiting example, each of the spring members 430 is approximately 20-25 millimeters in length and tapering from approximately 9 millimeters to approximately 4 millimeters. The thickness of each spring member is between approximately 1.5 and 2 millimeters.

Figure 7:
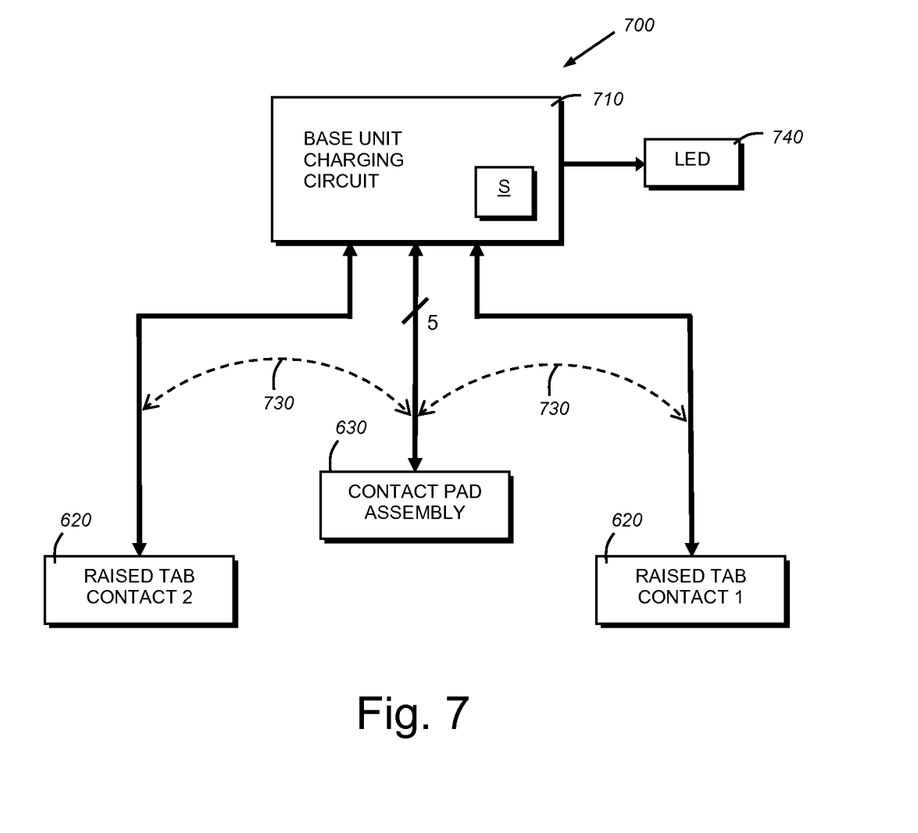
FIG. 7 is a block diagram showing the ability of the handheld ID reader of FIG. 1 to charge within the base unit via a connection with one raised tab and at least one contact pad of the central contact pad assembly.

Notably, and with further reference to the circuit schematic 700 of FIG. 7, the base unit charging circuit 710 is constructed and arranged to interconnect power or ground to at least one of the pads (640) of the contact pad assembly 630 via respective pins 310. Thus, if one of the two opposing conductive tabs 620 is out of contact with its associated base unit charging contacts 450 (due to a partially seated reader), the unit continues to charge as long as at least one of the tabs 620 engages a contact 450. The charging circuit 710 includes appropriate switching circuitry (S) that can be constructed according to ordinary skill (with appropriate current and voltage detection of "hot" connections) to cause a switchover (dashed arrows 730) from use of two charging contacts (450), to one charging contact and at least one pin (310) to complete the charging circuit.

In a more simplified circuit, the charging contacts 450 are both either power or ground and the pins are ground or power, respectively. This circuit also ensures that as long as at least one tab 620 engages at least one charging contact 450, that the reader will be charged.

The base unit charging circuit 710 (FIG. 7) also includes an indicator—such as a red and/or LED with associated driver circuitry 740, which indicates when the unit is actively charging—i.e. when the charge circuit is connected. Optionally, this unit can include a color change to (for example) green when charging is complete. Referring to FIGS. 1 and 2, notably, the LED 740 is positioned on the base unit 120 near (proximate) to the well 230 and also close to the inserted bottom end 136 of the reader. By "near" or "proximate" the distance of the indicator 740 is typically mounted on the base unit housing beside or behind the bottom end 136 of the reader within no more than approximately 1-3 centimeters from the side or rear edge of the well 230. This indicator 740 further assists the user in ensuring that the reader is properly seated and charging as his/her attention is focused on the engagement between the bottom end 136 of the reader and the charge connector of the base unit. Thus, the illumination of the LED 740 in this location (as shown in FIG. 1) provides more immediate visual feedback that the reader is charging.

Removal of the reader once charging is complete (or for any other reason) involves rotating the reader as shown generally in FIG. 2 so that the tabs 620 are drawn out of engagement with the shoulders 350. This motion also disconnects the engaged contacts on each component (base unit and reader).

It should be clear that the above-described ID reader and base unit provides a reliable and robust charging arrangement that avoids disadvantages in prior, individually-sprung or unsprung connectors. This arrangement is more forgiving of mis-seated readers and more generally provides better feedback that charging is properly occurring. The illustrative embodiment, furthermore, provides a more durable and reliable arrangement of electrical connectors between a base unit and handheld ID reader, and this arrangement can facilitate charging of the reader even when the reader is not completely secured within the base unit.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the size and/or shape of the reader, its grip handle, or both, is/are highly variable and the well of the base unit can be adapted to accommodate that size and/or shape. Additionally, as used herein various directional and orientation terms such as "vertical", "horizontal", "up", "down", "bottom", "top", "side", "front", "rear", "left", "right", and the like are used only as relative conventions and not as absolute orientations with respect to a fixed coordinate system, such as the acting direction of gravity. Accordingly, this description is meant to be taken only by way of example, and not to otherwise limit the scope of this invention.

What is claimed is:

1. A base unit for charging a handheld ID reader with a grip handle comprising:
   a housing having a well constructed and arranged to receive and hold the reader; and
   a contact holder having a plurality of electrically conductive contacts thereon that project forwardly from a surface of the well to removably engage corresponding electrically conductive reader contacts on a contact-carrying surface of the reader, the contact holder including leaf spring members being constructed and arranged to flex and rotate torsionally in response to a rearward biasing force on the contact holder, and
   wherein the contact holder is constructed and arranged to allow the electrically conductive contacts to move away from the reader against a biasing spring force from the leaf spring members in response to the rearward biasing force on the contact holder when the contact-carrying surface of the reader passes over the electrically conductive contacts as the reader is received by the well.

2. The base unit as set forth in claim 1 wherein the leaf spring members are constructed and arranged allow springed motion in response to passage of locking tabs on the reader over shoulders on the contact holder, and wherein the shoulders lock against the locking tabs when the reader is seated within the well and the leaf spring members bias the electrically conductive contacts into a locked position.

3. The base unit as set forth in claim 2 wherein the leaf spring members are tapered outwardly and engage opposing side walls of the housing.

4. The base unit as set forth in claim 2 wherein the contact holder includes top tabs defining a top edge that provides an axis of rotation about which the contact holder rotates when the leaf spring members are flexed and rotated torsionally.

5. The base unit as set forth in claim 4 wherein the leaf spring members are constructed unitarily with the contact holder.

6. The base unit as set forth in claim 2 wherein the locking tabs include conductive surfaces that are interconnected with a charging circuit configured to charge a reader battery, and further comprising base charging contacts located relative to the shoulders on the contact holder that electrically connect to each of the locking tabs respectively.

7. The base unit as set forth in claim 6 wherein the contact holder includes a circuit board having the electrically conductive contacts, the electrically conductive contacts comprising a plurality of contact pins and the contact-carrying surface includes the electrically conductive reader contacts comprising a plurality of contact pads each arranged to engage a respective one of the contact pins.

8. The base unit as set forth in claim 7 wherein at least some of the contact pads are separated by guiding fins.

9. The base unit as set forth in claim 6 wherein the charging circuit is constructed and arranged to charge the reader battery when either (a) at least one of the base charging contacts is interconnected to at least one of the locking tabs and at least one of the plurality of electrically conductive contacts on the contact holder electrically connect to at least one of the corresponding electrically conductive reader contacts n the reader, or (b) both of the base charging contacts are interconnected to respective of the locking tabs, and zero or more of the plurality of electrically conductive contacts on the contact holder each electrically connect to one of the corresponding electrically conductive reader contacts on the reader.

10. The base unit as set forth in claim 1 further comprising a charge indicator located on the housing proximate to the bottom end.

11. The base unit as set forth in claim 1 wherein the contact-carrying surface is located on a bottom face of the grip handle and the contact holder is located relative to a rear wall in the well.

12. A base unit for charging a handheld ID reader with a grip handle comprising:
    a housing having a well constructed and arranged to receive the reader;
    a plurality of spring-loaded electrically conductive contacts that project forwardly from the well to removably engage corresponding electrically conductive reader contacts on a contact-carrying surface of the reader;
    locking tabs on the reader that pass movably over and lock against spring loaded shoulders projecting from the well, wherein each of the locking tabs is associated with a tab conductive region that is arranged to interconnect with one of a plurality of electrically conductive base charging contacts, respectively; and
    a charging circuit constructed and arranged to charge a reader battery when at least one of the plurality of electrically conductive base charging contacts is interconnected to the tab conductive region and at least one of the plurality of electrically conductive contacts on a contact holder electrically connect to at least one of the corresponding electrically conductive reader contacts on the bottom face.

13. The base unit as set forth in claim 12 wherein the spring loaded electrically conductive contacts are located on the contact holder having leaf spring members extending outwardly from opposing sides thereof.

14. The base unit as set forth in claim 13 wherein the spring-loaded shoulders are located on the contact holder on each of opposing sides of the electrically conductive contacts and each of the electrically conductive base charging contacts is located with respect to one of the spring-loaded shoulders.

15. The base unit as set forth in claim 12 wherein the charging circuit is constructed and arranged to charge the reader battery when both of the electrically conductive base charging contacts are interconnected to a respective tab conductive region, and zero or more of the plurality of spring-loaded electrically conductive contacts each electrically connect to one of the corresponding electrically conductive reader contacts on the reader.

16. A base unit for charging a handheld ID reader with a grip handle comprising:
    a housing having a well constructed and arranged to receive the reader;
    a plurality of spring-loaded electrically conductive contacts that project forwardly from the well to removably engage corresponding electrically conductive reader contacts on a contact-carrying surface of the reader;
    a plurality of spring-loaded shoulders projecting from the well configured such that a plurality of locking tabs on the reader pass movably over and lock against the plurality of spring loaded shoulders projecting from the well, wherein each of the locking tabs is associated with a tab conductive region that is arranged to interconnect with one of a plurality of electrically conductive base charging contacts, respectively; and
    a charging circuit constructed and arranged to charge a reader battery when at least one of the plurality of electrically conductive base charging contacts is interconnected to the tab conductive region and at least one of the plurality of electrically conductive contacts on a contact holder electrically connect to at least one of the corresponding electrically conductive reader contacts on the bottom face.

* * * * *